United States Patent Office 2,750,269
Patented June 12, 1956

2,750,269

PROCESS OF MAKING AN ORGANIC COMPOST

George Klein, Menomonee Falls, Wis.

No Drawing. Application August 11, 1952,
Serial No. 303,840

1 Claim. (Cl. 71—21)

This invention appertains broadly to fertilizers and soil conditioners, and more particularly to a new compost and process of making such compost.

One of the primary objects of this invention is to produce a compost from cow or like manure as a base for packaging to the trade, which will not only be rich in nitrogen, phosphorous, potash, and other organic matter, but which will also effectively activate and revitalize soil.

Another salient object of the invention is to produce a loam-like manure compost of humus which will be entirely decomposed and substantially odorless, and which will not harm (burn) growing plants, and which can be used by farmers, gardeners and florists, both professional and amateur, to activate their own compost or manure piles.

A further important object of the invention is to provide an organic compost which includes manure mixed with straw, wood shavings, ground corn cobs, and chopped alfalfa stems and leaves treated in a predetermined way whereby all matter is broken down into soft crumbly loam-like particles, whereby the compost can be effectively spread over all the soil or mixed with the same.

A still further important object of my invention is to provide an improved process for making manure compost which consists in adding certain materials to the manure for the control of moisture and laying the mixture in definite windrows; turning and working the windrows according to heat and moisture to control the decomposing of all matter, and finally upon complete decomposition, screening and bagging the mixture for sale.

With these and other objects in view, the invention consists in the following mixture of materials and process of handling and working the same.

In the making of the compost the following materials are initially used: manure and urine, straw, wood shavings, corn cobs, chopped alfalfa, rock phosphate and lime.

For making one ton of the product, the following approximate proportions of material are utilized:

| | Pounds |
|---|---|
| Manure | 1500 |
| Straw | 100 |
| Wood shavings | 100 |
| Corn cobs | 100 |
| Chopped alfalfa | 50 |
| Rock phosphate | 60 |
| Crushed lime | 50 |

In practice, the straw, wood shavings, corn cobs and alfalfa are utilized as the bedding for the cows, and hence the straw, wood shavings, corn cobs and alfalfa are thoroughly mixed together and placed into the stalls and this bedding collects other secretions, such as urine from pregnant cattle which contains hormones, besides the manure.

The stalls are cleaned daily, and the manure is thoroughly mixed throughout the bedding. This mixture is placed in windrows out in the open for the action of sun and air thereon. The windrows are preferably about three to four hundred feet in length, about four to five feet in width and approximately three to four feet in depth at the crown. The bedding not only functions with the manure to add the desired minerals to the compost, but also functions to control moisture, which is important to the process.

It is also important to the process to control temperature of the windrows, and consequently, when the windrows reach a temperature of 140 degrees or above, the windrows are thoroughly agitated and turned and are preferably passed through a mixing machine, and I have found that a manure spreader is ideal for this purpose. In actual practice, the windrows are aerated and agitated and mixed approximately once a week and this agitating and mixing of the windrows continues approximately for a two-month period, depending on heat, sun and moisture. The material is stock piled for about six months, or until the material is very brittle or practically decomposed, and it will be found that the wood shavings, straw, and even the corn cobs crumble and disintegrate and become thoroughly mixed throughout the mass.

Where undue moisture is encountered, additional ground corn cobs or alfalfa can be added to the windrows during the passing of the mixture through the manure spreader.

Upon the complete decomposition of the matter, the compost is tossed on screens and thoroughly agitated so that all of the fine material will pass therethrough and at this time the fine material is bagged or otherwise packaged.

For home use, in growing potted plants, the compost can be placed in say, containers holding 2, 10, 25 and 50 pounds, and for commercial farming and lawns, the compost can be placed in 100 pound bags. It is produced to use a Pliofilm and polytex bag to reduce moisture loss.

The coarse matter retained on the screens is thrown back on the new piles of compost and this coarse matter functions to speed up the decomposing of this new matter in the windrows. This coarse matter, like a yeast, helps supply bacteria which breaks down the fibers in the composting materials.

The new compost owing to the bacteria therein, effectively revitalizes worn out soil and also supplies the needed minerals and organic matter taken out of the soil by growing plants.

It is again stressed that the amounts of material used in the mixture and time element is only approximate and not critical, and the amounts of material vary with the quality of the manure, moisture, sun, etc.

Changes in details may be made in the process and composition, but what I claim as new is:

The process of making an organic compost which consists in mixing a bedding composed of straw, wood shavings, corn cobs, alfalfa, rock phosphate and lime with cow manure and urine; second, piling the mixture in windrows in the open air; third, thoroughly agitating and mixing the materials in the windrows at predetermined intervals; fourth, adding ground corn cobs and alfalfa to the windrows during the turning and agitating thereof according to the moisture content of the windrows until decomposition takes place and finally, screening the decomposed material for uniformity.

References Cited in the file of this patent

UNITED STATES PATENTS

| | | |
|---|---|---|
| 35,417 | Harper | May 27, 1862 |
| 1,128,446 | Hilliard | Feb. 16, 1915 |
| 1,471,979 | Richards et al. | Oct. 23, 1923 |
| 2,035,286 | Wenzel | Mar. 24, 1936 |

FOREIGN PATENTS

| | | |
|---|---|---|
| 2,790 | Great Britain | A. D. 1873 |
| 3,378 | Great Britain | A. D. 1881 |

OTHER REFERENCES

Bruttini: Uses of Waste Material, King and Son, Ltd. 1923 (pages 222, 223, 225 and 303).

Garden Encyclopedia, Wise and Co., 1936, pages 296–297.

The Garden Dictionary, Houghton Mifflin Co., 1938, Composting page 165.